US007081230B2

(12) United States Patent
Blanchard

(10) Patent No.: US 7,081,230 B2
(45) Date of Patent: Jul. 25, 2006

(54) SPLIT-FLOW, VERTICAL AMMONIA CONVERTER

(75) Inventor: Kenneth Lewis Blanchard, Houston, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 676 days.

(21) Appl. No.: 10/065,759

(22) Filed: Nov. 15, 2002

(65) Prior Publication Data

US 2004/0096370 A1 May 20, 2004

(51) Int. Cl.
*C01C 1/00* (2006.01)
*B01J 8/04* (2006.01)
*F28D 1/00* (2006.01)

(52) U.S. Cl. ...................... 422/148; 422/188; 422/193; 422/195; 422/201

(58) Field of Classification Search ................ 422/188, 422/190, 193, 194, 195, 198, 200, 201, 239, 422/242, 148
See application file for complete search history.

(56) References Cited

U.S. PATENT DOCUMENTS 4,181,701 A * 1/1980 Topsoe et al. .............. 422/158
4,230,669 A 10/1980 Eagle et al. ................ 422/148
4,311,671 A * 1/1982 Notman ...................... 422/148
4,346,060 A 8/1982 Eagle et al. ................ 422/148
4,405,562 A 9/1983 Zardi et al. ................. 422/148
4,452,760 A 6/1984 Peterson et al. ............ 422/148
4,696,799 A 9/1987 Noe .......................... 422/148
5,250,270 A 10/1993 Noe .......................... 422/192
5,736,116 A * 4/1998 LeBlanc et al. ............ 423/359
6,132,687 A 10/2000 Noe .......................... 422/148
6,171,570 B1 1/2001 Czuppon .................... 423/359

* cited by examiner

*Primary Examiner*—Alexa D. Neckel
(74) *Attorney, Agent, or Firm*—Lundeen & Dickenson, LLP; Bradley A. Misley

(57) ABSTRACT

A vertical, fixed-bed ammonia converter wherein a fixed-bed catalyst zone is configured into two mechanically separated catalyst volumes and two gas streams that operate in parallel. The design maintains the ratio of gas flow to catalyst volume so that there is no catalyst effectiveness penalty. The catalyst beds and gas flow paths are configured so that gas flow is downward through each catalyst volume. Each fixed-bed catalyst zone in the present invention can hold the catalyst in an annular space formed between two concentric shrouds arranged around a shell and tube heat exchanger. The two catalyst beds associated with each zone are situated above one another along the length of an interstage heat exchanger. Pipes or conduits are disposed through the beds to effect the parallel gas flow configuration, or alternatively, annular flows are created via passages through the internal shrouds that contain the catalyst beds.

20 Claims, 3 Drawing Sheets

SPLIT-FLOW, VERTICAL AMMONIA CONVERTER

BACKGROUND OF INVENTION

This invention relates to ammonia converters for catalytically reacting a gaseous feed stream containing nitrogen and hydrogen to produce ammonia.

Elaborate and sophisticated reactor designs have been developed for converting nitrogen and hydrogen in the gas phase in a fixed catalyst bed to form ammonia. The designs have attempted to optimize the ratio of gas flow to catalyst volume for maximum catalyst effectiveness. Even so, it is still desirable to reduce the reactor size relative to the ammonia production capacity. The size of the reactor, of course, has an impact on its cost.

Ammonia converters are complicated by the fact that ammonia synthesis from nitrogen and hydrogen gas is exothermic and the reactions take place at high temperatures and pressures. Thus, interstage cooling is generally used between a series of catalyst zones to maintain kinetic and equilibrium conditions appropriate for optimum conversion efficiency. There must also be provision made for servicing the catalyst zones, e.g. periodically removing and replacing catalyst when it loses its effectiveness.

The use of the radial flow and mixed axial-radial flow arrangements in ammonia converter designs have become the standard for vertical ammonia converters. These designs, however, generally require the use of a freeboard or other catalyst volume that is ineffective. These designs can also complicate catalyst loading and removal, and require care in the design to avoid the potential for catalyst fluidization at the upper end of the radial flow catalyst volume.

SUMMARY OF INVENTION

The present invention is directed to a vertical, fixed-bed ammonia converter in which a fixed-bed catalyst zone is configured into two mechanically separated catalyst volumes and two gas streams that operate in parallel. The design maintains the ratio of gas flow to catalyst volume throughout the bed so that there is no catalyst effectiveness penalty compared to vertical radial-flow designs. The invention provides a reduction in reactor size since the two volumes can be optimally arranged within the reactor shell. The catalyst beds and gas flow paths are configured so that gas flow is downward through each catalyst volume, thus eliminating both the ineffective catalyst volume and the catalyst fluidization potential. The design facilitates the usual state-of-the-art alignment of heat exchangers and catalyst beds popular in the vertical, radial fixed-bed ammonia converters of the prior art.

Each fixed-bed catalyst zone in the present invention preferably holds the catalyst in an annular space formed between two concentric shrouds arranged around a shell and tube heat exchanger. The two catalyst beds associated with each zone are situated above one another along the length of an internal heat exchanger. In one preferred split-flow design, pipes or conduits are disposed through the beds to effect the parallel gas flow configuration. In another preferred embodiment, annular flows are created via passages through the internal shrouds that contain the catalyst beds.

In one embodiment, the present invention provides a vertical ammonia converter including a vessel having an upright cylindrical shell and a plurality of fixed bed catalyst zones vertically spaced apart in the vessel, including uppermost and lowermost catalyst zones and at least one intermediate catalyst zone. At least the uppermost and intermediate catalyst zones are concentrically disposed about a respective shell and tube heat exchanger for interstage cooling of effluent gas from the catalyst zones. Magnetite catalyst is disposed in the uppermost catalyst zone, and high activity catalyst in the intermediate and lowermost catalyst zones. At least the intermediate catalyst zones include at least two mechanically separated catalyst beds disposed vertically with respect to each other and configured for parallel downward gas flow split between the at least two catalyst beds.

The lowermost catalyst zone preferably has at least two mechanically separated catalyst beds disposed vertically with respect to each other and configured for parallel downward gas flow split between the at least two catalyst beds. The vessel shell preferably has a substantially uniform diameter along the length of the catalyst zones to facilitate fabrication. The vertical ammonia converter preferably includes respective pluralities of conduits passing through each respective catalyst bed to effect the parallel gas flow split, or respective annular flow passages around each catalyst bed to effect the split.

In another embodiment, an ammonia converter includes an upright cylindrical shell and at least one fixed bed zone disposed within the shell between an upper gas inlet zone and a lower gas outlet zone. The fixed bed zone has upper and lower catalyst volumes configured for downward gas flow in parallel through each volume. An annular housing for the catalyst volumes is formed by inner and outer concentric shrouds around a shell and tube heat exchanger. A partition plate in the annular housing is disposed between the upper catalyst volume and the lower catalyst volume. An upper discharge plenum is formed between the partition plate and a catalyst support below the upper catalyst volume. An intermediate inlet plenum is formed between the partition plate and the lower catalyst volume. A gas bypass is provided for diverting a portion of the downward gas flow from the gas inlet zone past the upper catalyst volume to the intermediate inlet plenum above the lower catalyst volume. There is a lower discharge plenum below a catalyst support at a lower end of the lower catalyst volume. A discharge passage is in fluid communication between each of the upper and lower discharge plenums and a shell-side fluid inlet to the heat exchanger. A shell-side fluid outlet from the heat exchanger is in fluid communication with the gas outlet zone. When it is desired to use the ammonia converter, the catalyst volumes are filled with a suitable ammonia conversion catalyst.

The gas bypass preferably includes a first plurality of tubes passing through the upper catalyst volume and upper discharge plenum. A second plurality of tubes can pass through the intermediate inlet plenum and lower catalyst volume, and communicate between the upper and lower discharge plenums. The outer shroud can depend from an inverted support cone secured between the shell and an upper end of the outer shroud. The discharge passage can include an annulus between the inner shroud and a concentric intermediate shroud having a larger diameter.

Alternatively, the gas bypass preferably includes an annulus between the outer shroud and the shell and a plurality of openings in the outer shroud into the intermediate inlet. The outer shroud can be supported on a support cone secured between the shell and a lower end of the outer shroud. The discharge passage can include an annulus between the inner shroud and a concentric intermediate shroud having a larger diameter. A plurality of openings can be formed in the intermediate shroud between the upper discharge plenum and the discharge passage. The fixed bed zone is preferably constructed as a modular pre-assembly attached to the shell via the support cone.

DETAILED DESCRIPTION

Figure 1:
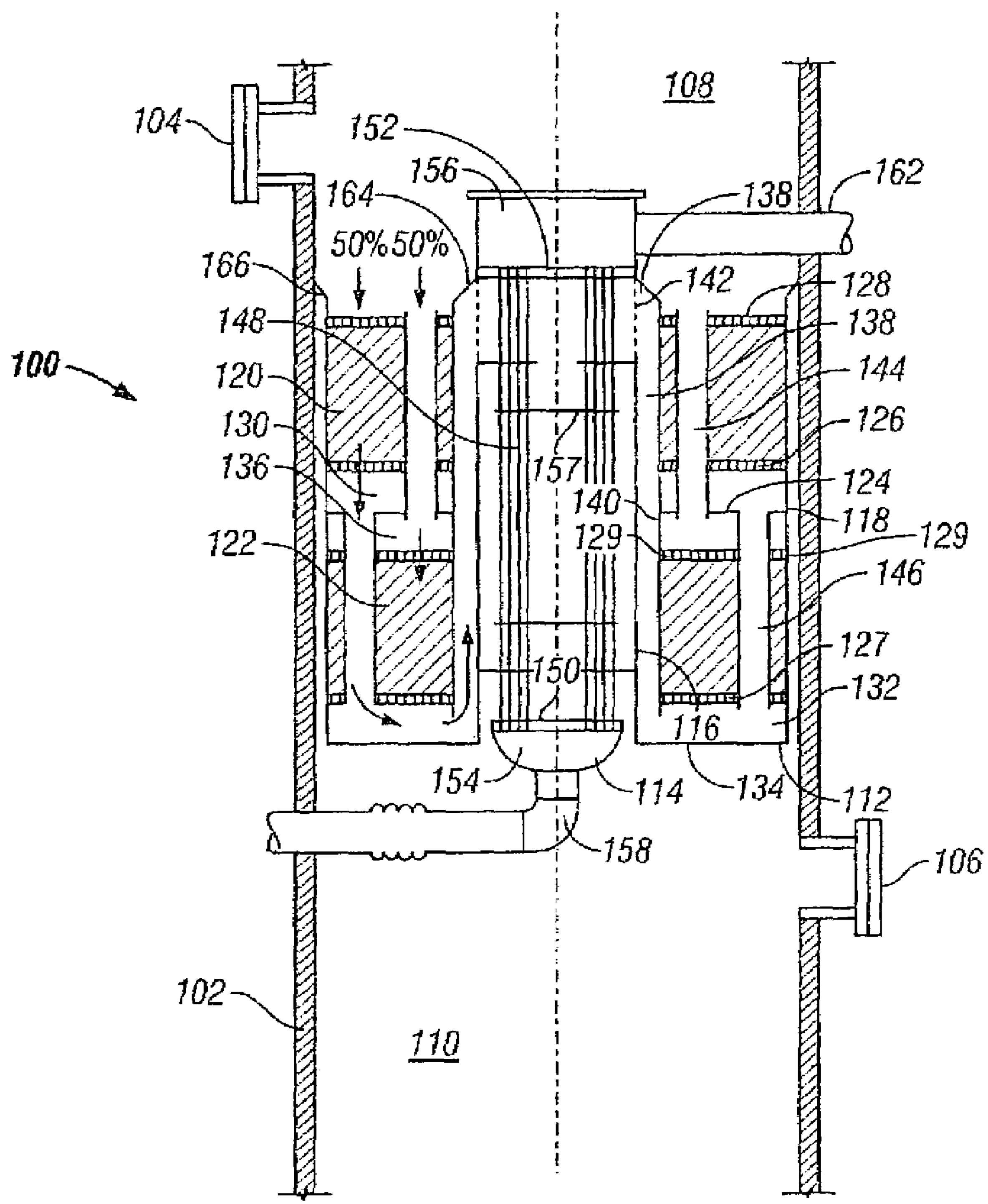
FIG. 1 is a schematic elevation shown partly in section of a split-flow, fixed-bed vertical ammonia converter according to one embodiment of the invention showing the use of pipes for splitting the gas flow between the catalyst volumes in the catalyst zone.

With reference to the drawings wherein the same reference numerals are used to refer to similar parts, FIG. 1 shows a catalyst zone 100 disposed within the vertical shell 102 of an ammonia converter according to one embodiment of the invention. Manways 104, 106 are provided for access at the respective gas inlet zone 108 and gas outlet zone 110.

A housing 112 is disposed concentrically about a shell-and-tube heat exchanger 114. The housing 112 has inner and outer concentric shrouds 116, 118. An intermediate shroud 140 is disposed outwardly of the inner shroud 116. The shrouds 118, 140 are disposed on either side of annular upper and lower catalyst volumes 120, 122. As used herein, the expression "catalyst volume" refers to the space intended to contain the ammonia conversion catalyst whether it actually contains the catalyst or has not yet been filled with catalyst. An annular partition plate 124 is disposed between the catalyst volumes 120, 122. Catalyst supports 126, 127 below each catalyst volume 120, 122 are made of a wire mesh, profile wire screen (e.g. trade designation Johnson Screen), or other structure well known in the art for supporting fixed catalyst beds. A similar screen 128, 129 is disposed at the top of each catalyst bed 120, 122. Each catalyst volume 120, 122 preferably has essentially the same volume, i.e. essentially the same inside diameter, outside diameter and depth, to facilitate the same extent of ammonia conversion handling essentially the same volume of gas supplied to each catalyst bed as described in more detail below.

An annular upper discharge plenum 130 is formed between the partition plate 124 and catalyst support 126. An annular lower discharge plenum 132 is similarly formed between the catalyst support 127 and an annular bottom panel 134 of the housing 112. An annular intermediate inlet plenum 136 is formed between the partition plate 124 and an upper end of the lower catalyst volume 122.

An annular discharge passage 138 is formed between the inner shroud 116 and a concentric intermediate shroud 140 spaced outwardly therefrom. There is a passage for gas between the lower end of the intermediate shroud 140 and the bottom panel 134. A shell-side fluid inlet 142 to an upper end of the heat exchanger 114 is provided by perforations at the upper end of the inner shroud 116.

A first plurality of pipes 144 is disposed to pass through the upper catalyst volume 120 and the partition plate 124. A second plurality of pipes 146 is disposed to pass through the partition plate 124 and the lower catalyst volume 122. If desired, the pipes 144, 146 can be evenly spaced in a circular configuration, but each set desirably presents essentially the same cross-sectional flow area and hydraulic radius to facilitate an even 50—50 split of gas supplied to each catalyst volume. If desired, any heat transfer to the gas in pipes 144, 146 can be minimized by using an appropriate diameter to minimize surface area and to obtain an appropriate heat transfer coefficient (i.e. wall thickness, double pipe construction and/or insulation). Where heat transfer is significant enough to heat the gas passing through the pipes 144 and/or 146, the depth of the upper and/or lower catalyst volumes 120, 122 can be adjusted slightly to compensate.

The heat exchanger 114 is familiar to those familiar with similar interstage heat exchangers employed in the prior art radial-flow ammonia converters. The shell is formed by the inner shroud 116. The tubes 148 are supported at either end by tube sheets 150, 152 at respective inlet and outlet heads 154, 156 and pass through conventional baffles 157. Cooling fluid, which can usually comprise feed gas, is introduced via inlet pipe 158 connected to the inlet head 154. The inlet head 154 preferably has an outside diameter that is less than that of the inner shroud 116 to provide an annular passage for cooled shell-side gas to enter the gas outlet zone 110. The outlet head 156 preferably has an outside diameter about that of the inner shroud 116. Heated cooling fluid is exhausted from the outlet head 156 via outlet pipe 162.

The intermediate shroud 140 is supported from the outlet head 156 by means of conical ring 164. The outer shroud 118 is secured at its upper end to the shell 102 by means of conical support ring 166. The rings 164, 166 seal the housing 112 to prevent gas from bypassing the catalyst zone 100.

Catalyst is introduced into and/or removed from the upper catalyst bed 120 in a conventional manner. Catalyst can be introduced into and/or removed from the lower catalyst bed 122 by inserting hose(s) (not shown) through the pipes 144. The catalyst loading can also be facilitated by employing removable top hold down screens 128, 129 and providing personnel access ways (not shown) through the upper bed support grid 126 and partition plate 124. This allows the lower bed to be loaded and the hold down grid 129 installed, after which the hatch ways in the personnel access openings are installed, the upper bed loaded, and the hold down grid 128 installed.

In one example of the FIG. 1 embodiment, the shell 102 could have an inside diameter of 12 feet, the outer shroud 118 a diameter of 11.5 feet, the intermediate shroud 140 a diameter of 5 feet, and inner shroud 116 a diameter of 4 feet. The inlet and outlet pipes 158, 162 can have a nominal diameter of 12 inches, and the tubes 148 a length of 12 feet. The plenums 130, 132, 136 can have a height of 1 foot, and the catalyst supports 126, 127 and screens 128, 129 a thickness of approximately 3 inches. In this example, 4 ten-inch pipes 144, 146 can be used through each of the beds 120, 122, which each have a depth of 3.5 feet. The total catalyst volume is 567 cubic feet and the pressure drop (excluding the heat exchanger) is estimated at 6.7 psi.

Figure 2:
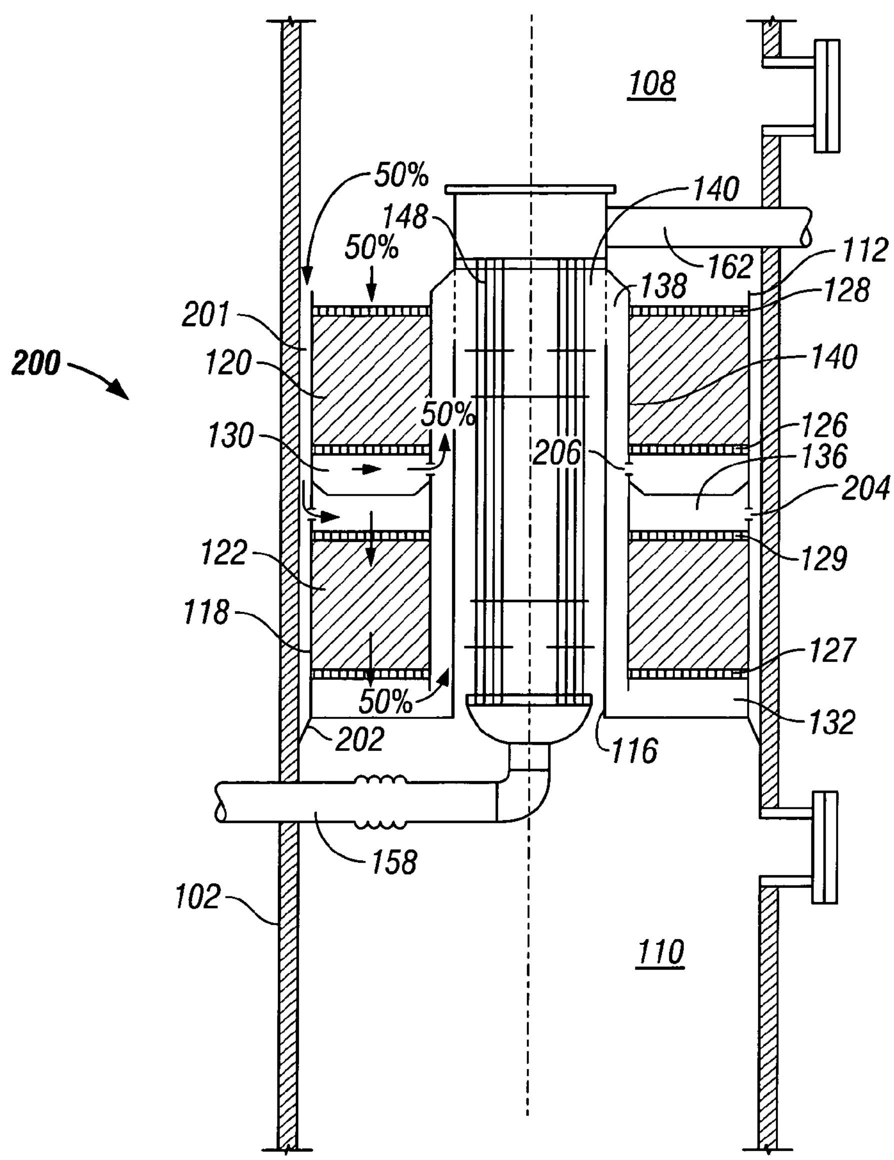
FIG. 2 is a schematic elevation shown partly in section of a split-flow, fixed-bed vertical ammonia converter according to anther embodiment of the invention showing the use of an annular passage for splitting the gas flow between the catalyst volumes in the catalyst zone.

FIG. 2 shows a catalyst zone 200 similar to the embodiment of FIG. 1, but it uses an external bypass to supply the feed gas to the lower catalyst bed 122 rather than the internal bypass pipes of FIG. 1. The annulus 201 between shell 102 and outer shroud 118 has an open upper end in fluid communication with the gas inlet zone 108. A support cone 202 securing a lower end of the housing 112 to the shell 102 forms a fluid-tight seal at the lower end of the annulus 201 against the gas outlet zone 110. A plurality of perforations 204 is formed in the outer shroud 1/8 to provide fluid communication between the annulus 201 and the intermediate inlet plenum 136. A plurality of perforations 206 is similarly formed in the intermediate shroud 140 to provide fluid communication from the outlet plenum 130 into the discharge passage 138. The perforations 204, 206 should be sized and numbered to match the respective fluid flow resistance to provide an essentially even 50—50 split of feed gas between the upper and lower catalyst beds 120, 122.

In one example of the FIG. 2 embodiment, the shell 102 could have an inside diameter of 12 feet, the outer shroud 118 a diameter of 11 feet, the intermediate shroud 140 a diameter of 5 feet, and inner shroud 116 a diameter of 4 feet. The inlet and outlet pipes 158, 162 can have a nominal diameter of 12 inches, and the tubes 148 a length of 12 feet. The plenums 130, 136 can have a height of 15 inches, the plenum 132 a height of 12 inches, and the catalyst supports 126, 127 and screens 128, 129 a thickness of approximately 3 inches. The beds 120, 122 each have a depth of 3.75 feet. The total catalyst volume is 565 cubic feet and the pressure drop (excluding the heat exchanger) is estimated at 7.6 psi.

The present invention has the additional benefit of minimizing radial thermal stresses, confining these primarily to the axial dimension. The present invention also allows a modular construction. In the FIG. 2 embodiment, for example, the accessibility of the support cone 202 allows a modular construction of the mechanical components of the zone 200 to be employed so that the assembled module, sans catalyst, can be lowered into the shell 102 and secured by welding the periphery of the support cone 202. The FIG. 1 embodiment is supported at the top so axial thermal expansion of the components, including the shrouds and exchanger tubes, is downward, and any slight differences in thermal expansion can be accounted for at the bottom. In addition, the FIG. 1 embodiment has no open spaces at the top that would allow tools, parts, debris or the like to drop into it during loading or unloading. The FIG. 2 design disposes the annular gas flow adjacent to the vessel shell with the result that the reactor length is minimized.

Figure 3:
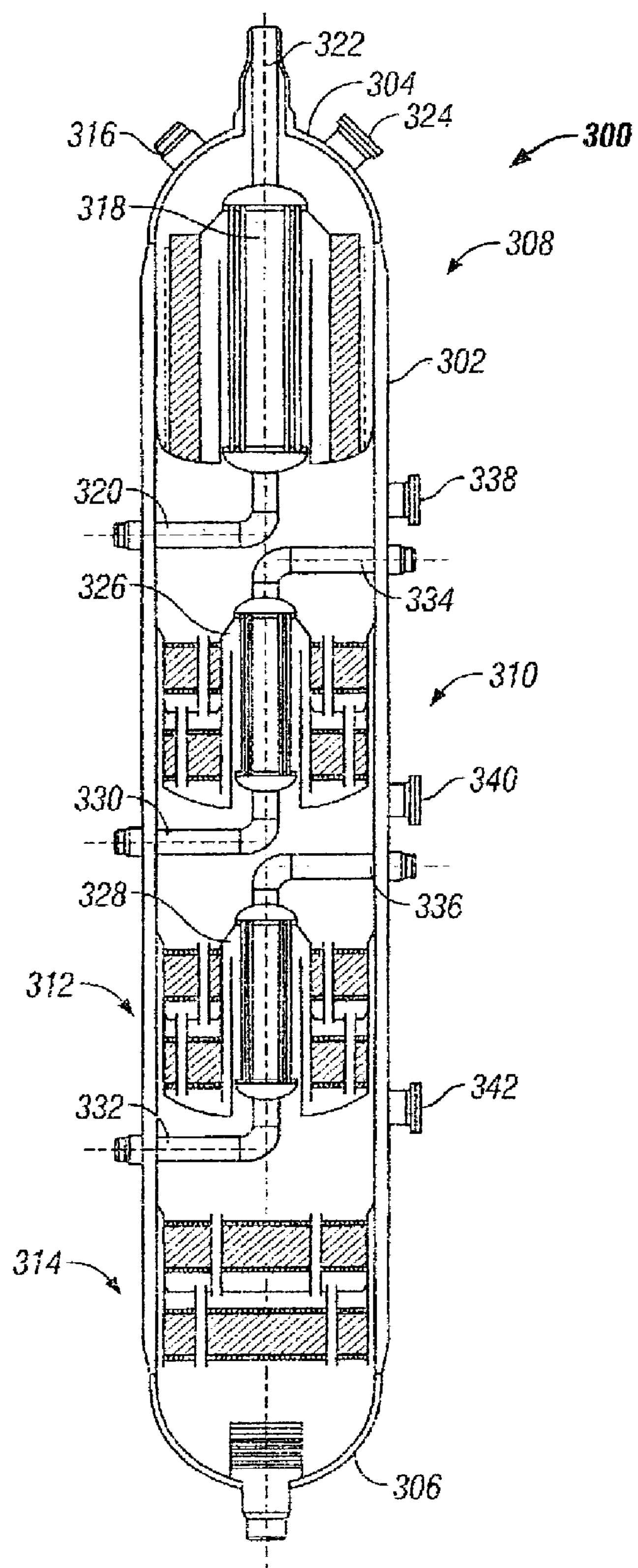
FIG. 3 is a schematic elevation shown partly in section of a vertical ammonia converter according to another embodiment of the invention showing a plurality of parallel split-flow, fixed-bed catalyst zones below a conventional top bed.

In FIG. 3 there is illustrated one embodiment of an integrated multi-zone vertical ammonia converter 300 based on the principles of the present invention. The vessel has a vertical cylindrical shell 302 of uniform diameter and conventional domed top and bottom heads 304, 306. First, second, third and fourth catalyst zones 308, 310, 312, 314 are vertically spaced within the vessel from top to bottom. The first zone 308 preferably contains magnetite catalyst, whereas the other zones 310, 312, 314 preferably contain high activity ammonia conversion catalyst well known to those skilled in the art, as disclosed, for example, in U.S. Pat. Nos. 4,055,628; 4,122,040; and 4,163,775; hereby incorporated herein by reference. In contrast to many prior art radial-flow vertical ammonia converters in which the shell has an enlarged diameter about the first catalyst zone, the present design facilitates fabrication by using a shell 302 that has a uniform diameter.

Feed gas is introduced to the top of the converter 300 via inlet nozzle 316. The first magnetite catalyst zone 308 is preferably of a conventional radial flow design and contains first interstage heat exchanger 318 and associated cooling fluid inlet and outlet pipes 320, 322 passing through the shell 302 and top head 304, respectively. The first catalyst bed 308 can be serviced via manway 324.

Second, third and fourth catalyst zones 310, 312 and 314 contain high activity catalyst and are generally constructed in accordance with the design of FIG. 1 as described above. The skilled artisan will readily appreciate that the design of FIG. 2 could be used as an alternate. Second and third catalyst zones 310, 312 are associated with respective interstage heat exchangers 326, 328, cooling fluid inlet pipes 330, 332, and cooling fluid outlet pipes 334, 336. The fourth catalyst zone 314 is preferably not associated with an interstage cooler since it is the terminal catalyst zone and does not need to be cooled within the reactor, but could be associated with a concentric heat exchanger (not shown), if desired. Manways 338, 340, 342 are provided above each of the respective catalyst zones 310, 312, 314 for catalyst addition and/or removal or other service.

The invention is illustrated by the foregoing description and examples. Those skilled in the art will develop various changes and modifications in view of the foregoing embodiments. It is intended that all such changes and modifications within the scope or spirit of the appended claims be embraced thereby.

The invention claimed is:

1. A vertical ammonia converter, comprising:
a vessel having an upright cylindrical shell;
a plurality of fixed bed catalyst zones vertically spaced apart in the vessel, including uppermost and lowermost catalyst zones and at least one intermediate catalyst zone;
at least the uppermost and intermediate catalyst zones concentrically disposed about a respective shell and tube heat exchanger for interstage cooling of effluent gas from said catalyst zones;
magnetite catalyst disposed in the uppermost catalyst zone and high activity catalyst disposed in the intermediate and lowermost catalyst zones;
wherein at least the intermediate catalyst zones comprise at least two mechanically separated catalyst beds disposed vertically with respect to each other and configured for parallel downward gas flow split between the at least two catalyst beds.

2. The vertical ammonia converter of claim 1 wherein the lowermost catalyst zone comprises at least two mechanically separated catalyst beds disposed vertically with respect to each other and configured for parallel downward gas flow split between the at least two catalyst beds.

3. The vertical ammonia converter of claim 1 wherein the upright cylindrical shell has a substantially uniform diameter along the length of the catalyst zones.

4. The vertical ammonia converter of claim 1 comprising respective pluralities of conduits passing through each respective catalyst bed to effect the parallel gas flow split.

5. The vertical ammonia converter of claim 1 comprising annular flow passages (201) around the upper one of the catalyst beds to effect the parallel gas flow split.

6. The vertical ammonia converter of claim 1 wherein the at least one intermediate catalyst zone and the shell-and-tube heat exchanger comprise a modular pre-assembly wherein the shell of the shell-and-tube heat exchanger comprises a centrally disposed inner shroud of the at least one intermediate catalyst zone.

7. An ammonia converter, comprising:
an upright cylindrical shell;
at least one fixed bed zone disposed within the shell between an upper gas inlet zone and a lower gas outlet zone and comprising upper and lower catalyst volumes configured for downward gas flow in parallel through each volume;
an annular housing for the catalyst volumes formed by inner and outer concentric shrouds disposing the catalyst volumes in an annulus around a centrally disposed shell-and-tube heat exchanger;

a partition plate in the annular housing disposed between the upper catalyst volume and the lower catalyst volume;

an upper discharge plenum formed between the partition plate and a catalyst support below the upper catalyst volume;

an intermediate inlet plenum formed between the partition plate and the lower catalyst volume;

a gas bypass for diverting a portion of the downward gas flow from the gas inlet zone past the upper catalyst volume to the intermediate inlet plenum above the lower catalyst volume;

a lower discharge plenum below a catalyst support at a lower end of the lower catalyst volume;

a discharge passage in fluid communication between the upper and lower discharge plenums and a shell-side fluid inlet to the heat exchanger;

a shell-side fluid outlet from the heat exchanger in fluid communication with the gas outlet zone.

8. The ammonia converter of claim 7 wherein the gas bypass comprises a first plurality of tubes passing through the upper catalyst volume and upper discharge plenum.

9. The ammonia converter of claim 8 comprising a second plurality of tubes passing through the intermediate inlet plenum and lower catalyst volume, and communicating between the upper and lower discharge plenums.

10. The ammonia converter of claim 9 wherein the outer shroud depends from an inverted support cone secured between the upright cylindrical shell and an upper end of the outer shroud to form a gas seal therewith between the upper gas inlet zone and the lower gas outlet zone.

11. The ammonia converter of claim 7 wherein the discharge passage comprises an annulus between the inner shroud and a concentric intermediate shroud having a larger diameter.

12. The ammonia converter of claim 7 wherein the gas bypass comprises an annulus between the outer shroud and the upright cylindrical shell and a plurality of openings in the outer shroud into the intermediate inlet.

13. The ammonia converter of claim 12 wherein the outer shroud is supported on a support cone secured between the upright cylindrical shell and a lower end of the outer shroud to form a gas seal therewith between the upper gas inlet zone and the lower gas outlet zone.

14. The ammonia converter of claim 13 wherein the discharge passage comprises an annulus between the inner shroud and a concentric intermediate shroud having a larger diameter and a plurality of openings in the intermediate shroud to receive fluid from the upper discharge plenum.

15. The ammonia converter of claim 13 wherein the fixed bed zone comprises a modular pre-assembly attached to the upright cylindrical shell via the support cone.

16. The ammonia converter of claim 7 wherein the catalyst volumes are filled with catalyst.

17. The ammonia converter of claim 7 wherein the inner shroud forms the shell-and-tube heat exchanger shell.

18. The ammonia converter of claim 7 further comprising a seal between the outer shroud and the upright cylindrical shell of the vessel to prevent gas from bypassing the fixed bed zone.

19. A vertical ammonia converter, comprising:

a vessel having an upright cylindrical shell;

a plurality of fixed bed catalyst zones vertically spaced apart, including at least one catalyst zone module independently supported in the vessel above a lowermost catalyst zone;

the at least one catalyst zone module comprising:

a centrally disposed shell-and-tube heat exchanger for interstage cooling of effluent gas from at least two mechanically separated, annular, axial-flow catalyst beds secured to an outer shell of the shell-and-tube heat exchanger and disposed vertically with respect to each other;

passages for parallel downward gas flow split between the at least two catalyst beds concentrically disposed;

an outer shroud having an outside diameter less than an inside diameter of the upright cylindrical shell of the vessel to define an annular space; and a conical support ring between the outer shroud of the at least one catalyst zone module and the upright cylindrical shell of the vessel forming a gas seal at the annular space and supporting the at least one catalyst zone module.

20. The vertical ammonia converter of claim 19 wherein the conical support ring is inverted.

* * * * *